United States Patent Office 3,072,606
Patented Jan. 8, 1963

3,072,606
HARDENABLE COMPOSITIONS COMPRISING EPOXIDE COMPOUNDS AND CYCLIC ETHERS OR THIOETHERS
Paul Zuppinger, Arlesheim, and Hans Brueschweiler, Basel, Switzerland, assignors to Ciba Limited, Basel, Switzerland, a Swiss firm
No Drawing. Filed Mar. 23, 1959, Ser. No. 800,946
Claims priority, application Switzerland Mar. 27, 1958
5 Claims. (Cl. 260—47)

It is known to polymerize tetrahydrofurane alone in the presence of a Friedel-Crafts or boron trifluoride. However, it is stated in Public Board Report No. 717, page 1060, that it has not been possible to polymerize derivatives of tetrahydrofurane.

The present invention is based on the unexpected observation that substituted tetrahydrofuranes, and also furane and thiophene and substitution products of these compounds, can be reacted with epoxide resins in the presence of a Friedel-Crafts catalyst or a metal fluoborate or boron trifluoride.

Accordingly, the invention provides hardenable compositions which comprise (1) an epoxide compound which contains $n$ epoxide groups calculated on the average molecular weight, $n$ being a whole number or a fractional whole number greater than 1, (2) a cyclic ether or thioether of the formula

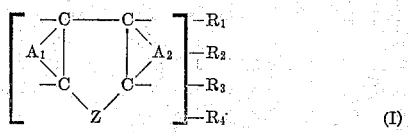

(I)

in which $R_1$, $R_2$, $R_3$ and $R_4$ each represent a hydrogen atom or a monovalent substituent, more especially an aliphatic, cycloaliphatic, araliphatic or aromatic radical, or $R_1$ and $R_2$ and/or $R_3$ and $R_4$ are together members of a cyclic system, $A_1$ represents two hydrogen atoms or monovalent substituents or a carbon-to-carbon bond, $A_2$ represents a monovalent substituent or a hydrogen atom or two monovalent substituents or a carbon-to-carbon bond, and Z represents an oxygen or sulfur atom, and which compound contains the indicated 5-membered cyclic ether or thioether group only once, and (3) a Friedel-Crafts catalyst or a metal fluoborate or boron trifluoride.

The invention also provides a process for the manufacture of hardened resins, wherein an epoxide compound which contains $n$ epoxide groups calculated on the average molecular weight, $n$ being a whole or fractional number greater than 1, is reacted with a cyclic ether or thioether of the above Formula I in the presence of a Friedel-Crafts catalyst or a metal fluoborate or boron trifluoride.

The epoxide compounds used in the invention have a 1:2-epoxy equivalency greater than 1.0. By the epoxy-equivalency reference is made to the average number of 1:2-epoxy groups

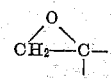

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds of the kind defined above, which are to be reacted with the cyclic ethers or thioethers of the Formula I there may be mentioned, for example, epoxidated diolefines, dienes or cyclic dienes, such as butadiene dioxide, 1:2:5:6-diepoxy-hexane and 1:2:4:5-diepoxy-cyclohexane; epoxidated diolefinically unsaturated carboxylic acid esters, such as methyl-9:10:12:13-diepoxy-stearate; the dimethyl ester of 6:7:10:11 - diepoxy-hexadecane-1:16 - dicarboxylic acid, epoxidated compounds containing two cyclohexenyl radicals, such as diethylene glycol bis-(3:4-epoxy-cyclohexane carboxylate) and 3:4-epoxy-cyclohexyl-methyl-3:4-epoxy-cyclohexane carboxylate. Furthermore basic polyepoxide compounds, such as are obtained by the reaction of a primary or secondary aromatic diamine, such as aniline or 4:4'-di-[monomethylamino]-diphenylmethane, with epichlorhydrin in the presence of an alkali.

There may also be used polyglycidyl esters, such as are obtainable by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azolaic acid, sebacic acid and especially aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol-bis-(para-carboxyphenyl) ether or the like. There may be mentioned, for example, diglycidyl adipate and diglycidyl phthalate and also diglycidyl esters which correspond to the average formula

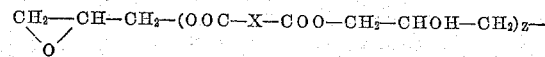

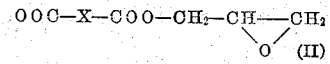

(II)

in which X represents an aromatic hydrocarbon radical, such as a phenyl group, and Z represents a whole or fractional small number.

There may also be used polyglycidyl ethers such as are obtainable by the etherification of a polyhydric alcohol or polyphenol with epichlorhydrin or dichlorhydrin in the presence of an alkali. These compounds may be derived from glycols, such as ethylene glycol, diethylene glycol, triethylene glycol, propylene glycol-(1:2), propylene glycol-(1:3), butylene glycol-(1:4), pentane-diol-(1:5), hexane-diol-(1:6), hexane-triol-(2:4:6) or glycerine, and especially from polyphenols, such as phenol novolacs, cresol novolacs, resorcinol, pyrocatechol, hydroquinone, 1:4 - dihydroxynaphthalene, bis - [4 - hydroxyphenyl] - methane, bis - [4 - hydroxyphenyl]-methylphenylmethane, bis - [4 - hydroxyphenyl] - tolyl methane, 4:4'-dihydroxydiphenyl, bis-[4-hydroxyphenyl]-sulfone and especially 2:2-bis-[4-hydroxyphenyl]-propane. There may be mentioned, for example, ethylene glycol diglycidyl ether and resorcinol diglycidyl ether and also diglycidyl ethers which correspond to the average formula

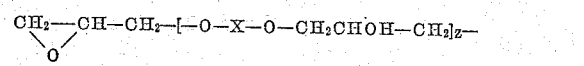

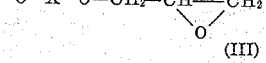

(III)

in which X represents an aromatic radical, and Z represents a whole or fractional small number.

There are especially suitable epoxy-resins that are liquid at room temperature, for example, those of 4:4'-dihydroxydiphenyl-dimethylmethane which have an epoxide content of about 3.8 to 5.8 epoxide equivalents per kilogram. Such epoxy-resins correspond, for example, to the average formula

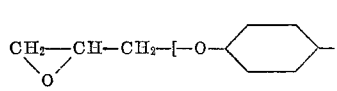—O—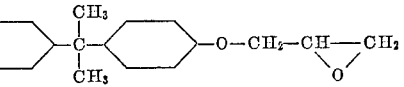—O—CH₂—CHOH—CH₂—]z—O—⌬—C(CH₃)₂—⌬—O—CH₂—CH—CH₂ (epoxide)

in which Z represents a whole or fractional small number, for example, between 0 and 2.

Alternatively, solid epoxy-resins may be used in the molten state or in solution.

As cyclic ethers or thioethers of the Formula I there may be mentioned thiophene, furane, and derivatives of thiophene, of tetrahydrothiophene, of furane, of dihydrofurane and especially of tetrahydrofurane.

As substituents $R_1$, $R_2$, $R_3$ and $R_4$ in the Formula I there may be mentioned monovalent substituents, for example, a halogen atom, a hydroxyl group, a nitro group or especially an aliphatic, cycloaliphatic, araliphatic or aromatic radical, which may be substituted by functional groups or interrupted by heteroatoms. When $A_1$ and/or $A_2$ represents a substituent those symbols have the same meaning as for $R_1$, $R_2$, $R_3$ or $R_4$.

Among the derivatives of thiophene there may be mentioned: 2-methyl-thiophene, 2:3-dimethyl-thiophene, 2:5-dimethyl-thiophene, 2-ethyl-thiophene, 2:3:4-triethyl-thiophene, 2-butylthiophene, 2:5-di-(tertiary butyl)-thiophene, 2-tertiary octyl-thiophene, 2-vinyl-thiophene, 2:3-benzothiophene, 2-phenyl-thiophene, 2-methyl-4-phenyl-thiophene, 2-benzyl-thiophene, dibenzothiophene, benzhydrylthiophene, 2-chlorothiophene, 2:5-dichlorothiophene, 2:3:5-trichloro-thiophene, 2:3:4:5-tetrachlorothiophene, 2-chloromethylthiophene, 2:5-dinitrothiophene, 2-thenylalcohol, 2-thiophenaldehyde, 2-acetyl-thiophene, 2-thiophenecarboxylic acid, 2-thiophenecarboxylic acid ethyl ester, 5-chloro-2-thiophene carboxylic acid, 5-methyl-2-thiophene carboxylic acid, 2-thienyl cyanide, and β-[α-thienyl]-acrylic acid. Among the derivatives of tetrahydrothiophene there may be mentioned 2-methyl-tetrahydrothiophene and 2:2:3:4:5:5-hexachlorothiolane.

Among the derivatives of furane there may be mentioned 2-methylfurane, 3-methyl furane, 2:3-dimethyl furane, 2:4-dimethyl furane, 2:5-dimethyl furane, 2-ethyl furane, 3-ethyl furane, 2-propyl furane, 3-isopropyl furane, 2:3:4-trimethyl furane, 2-butyl furane, 2:5-diethyl furane, tetramethyl furane, 2-vinyl furane, 2:3-benzofurane (coumarone), methyl coumarone, dimethyl coumarone, trimethyl coumarone, 2-phenyl furane, 3-phenyl furane, 2-benzyl furane, benzyl furfuryl, α-naphthofurane, β-naphthofurane, dibenzol furane, benzhydryl furane, 2:3:4-trichlorofurane, furfuryl chloride, furfuryl bromide, nitrofurane, furfuryl alcohol, methyl furfuryl ether, propyl furfuryl ether, furfuryl acetate, furfuryl benzoate, carbamic acid furfuryl ester, 2-acetyl furane, furfurol, 2-furane carboxylic acid (pyromucic acid), pyromucic acid methyl ester, pyromucic acid phenyl ester, 2-furyl cyanide, 2-furyl acetic acid, furfuryl acetic acid, β-[α-furyl]-acrylic acid.

Among the derivatives of dihydro-furane there may be mentioned: 2-methyl-4:5-dihydrofurane, 2-ethyl-2:5-dihydrofurane, 2-methyl-5-ethyl-2:3-dihydrofurane, 2:2:5:5-tetramethyl-2:5-dihydrofurane.

Among the preferred group of derivatives of tetrahydrofurane there may be mentioned: 2-methyltetrahydrofurane, 2:2-dimethyl tetrahydrofurane, 2:5-dimethyltetrahydrofurane, 2:2:4:4-tetramethyltetrahydrofurane, 2:2:5:5-tetramethyltetrahydrofurane, 2:5-dimethyl-2-isopropyltetrahydrofurane, 2:5 - dimethyl - 2:5 - diethyltetrahydrofurane, 2:5-diphenyltetrahydrofurane, tetrahydrofurfuryl chloride, tetrahydrofurfuryl bromide, tetrahydrofurfuryl alcohol, tetrahydrofurfuryl acetate, tetrahydrofurfuryl butyrate, tetrahydrofurfuryl benzoate, tetrahydrofurfuryl allyl alcohol, tetrahydrofurfurol, tetrahydrofurfuryl-acetone, tetrahydrofurane carboxylic acid-(2), tetrahydrofurane dicarboxylic acid-(2:5) and 1:4-epoxycyclohexane.

As Friedel-Crafts catalysts there may be mentioned aluminum chloride, ferric chloride, zinc chloride, antimony trichloride and tin tetrachloride, and as metal fluoborates the fluoborates of zinc, tin, lead, iron, nickel, copper, cobalt, magnesium, cadmium, mercury, calcium, strontium, barium and aluminum. There are preferably used the following catalysts: Boron trifluoride, tin tetrachloride, antimony pentachloride and the fluoborates of zinc, tin, lead, iron and nickel. The catalyst may be added to the compositions as such, or after being converted into complexes thereof. As compounds capable of forming complexes there may be used water, alcohols, ethers, ketones, carboxylic acids, carboxylic acid anhydrides, amines, amides, sulfides etc. The cyclic ethers or thioethers of the Formula I for example, can be used as substances forming complexes, and instead of them other cyclic ethers or thioethers may be used, for example, tetrahydrofurane itself. The complexes can then be formed by simple dissolution of a Friedel-Crafts catalyst or boron trifluoride in an excess of the cyclic ether or thioether.

The boron trifluoride is advantageously used in the form of a stable complex thereof with water or a nitrogenous base. For example, the stable complexes with water or a nitrogenous base may first be formed. The complex can then be diluted with the cyclic ether, whereby a stable non-polymerizing solution is obtained, which is mixed with the epoxide compound shortly before use. Alternatively, the boron trifluoride may first be dissolved in a quantity of the cyclic ether or thioether in excess of the stoichiometric quantity required to form the complex, the ether or thioether containing the necessary small proportion of nitrogen base or water, for example, at least one percent and advantageously two to five percent of water calculated on the ether or thioether. The presence of such compounds capable of forming complexes somewhat retards the speed of hardening, which in some cases may be desirable.

As such moderators there may be used nitrogenous bases capable of forming stable complexes with boron trifluoride, for example, ammonia, ethylamine, ethylene diamine, monoethanolamine, piperidine, triethanolamine, urea, hexamethylene tetramine, trimethylamine, pyridine and especially aromatic amines, such as aniline, toluidine and Schiff's bases of such amines. There are preferably used as moderators either Schiff's bases of aromatic amines, for example, the Schiff's base of aniline and benzaldehyde, or water, with boron trifluoride. For example, boron trifluoride and water form stable liquid hydrates, such as $BF_3 \cdot H_2O$ and $BF_3 \cdot 2H_2O$. When water is used as moderator the hardening proceeds exothermically at room temperature. When a Schiff's base of an aromatic amine with an aromatic aldehyde is used, hardening generally proceeds exothermically only when heat is supplied, for example, after short heating to about 60° C., and hardening occurs at room temperature only after long standing and without any detectable evolution of heat. In addition to retarding the speed of the reaction, the presence of a small proportion of water suppresses the harmful coagulation which occasionally occurs when the epoxide compound is mixed with an anhydrous solution of boron trifluoride in the cyclic ether or thioether, and lead to non-homogeneous hardening. It may therefore be of advantage to use water and a nitrogenous base jointly as moderators.

The relative proportions of the epoxide compound and the cyclic ether or thioether of the Formula I may vary within wide limits. For certain uses the proportion of the cyclic ether or thioether may be small and in that order of magnitude which is necessary for the formation of a relatively stable complex with the Friedel-Crafts catalyst or boron trifluoride. In the case of boron trifluoride, for example, this generally corresponds to an excess amounting to approximately 10 times the stoichiometric quantity of the ether or thioether required for complex formation. Tests have shown that it is of advantage for example, to use at least five parts of a solution of 10% strength of boron trifluoride for every 100 parts of a polyglycidyl ether of 4:4'-dihydroxyphenyl-dimethylmethane having an epoxide content of 4.03 epoxide equivalents per kilogram, that is to say, 1.25 grams of boron trifluoride per gram equivalent of epoxide groups.

In an advantageous form of the invention a larger proportion of the substituted cyclic ether or thioether is used, so that the ratio of epoxide-compound to cyclic ether or thioether is about 100:5–50 and preferably 100:10–30. It is also of advantage to use not more than 1 mol of the cyclic ether or thioether for each epoxide equivalent of the epoxide compound.

When boron trifluoride and water are used jointly it is of advantage to use at least about 0.2, and preferably 0.5 to 3.0 parts by weight of water for each part by weight of boron trifluoride.

The hardenable compositions of the invention may also contain suitable plasticisers or inert diluents. An addition of a plasticiser, such as dibutyl phthalate, dioctyl phthalate or tricresyl phosphate, yields softer elastic and flexible hardened masses.

It may also be of advantage, depending on the properties desired in the polymerized resin, to add an active diluent or modifying agent which under the action of the Friedel-Crafts catalyst or boron trifluoride reacts within the epoxide resin and takes part in the hardening reaction, for example, an ethylenically unsaturated polymerizable compound, such as styrene, monoepoxide compounds, such as cresyl glycide; other cyclic ethers such as tetrahydrofurane; mono- or advantageously polyfunctional compounds which contain hydroxyl groups, keto groups, aldehyde groups or carboxyl groups, for example, dihydric or polyhydric alcohols, polyglycols, and polyesters having terminal hydroxyl or carboxyl groups, can be incorporated under the influence of the Friedel-Crafts catalyst or boron trifluoride.

There may also be incorporated with the hardenable compositions the usual additions, such as accelerators, for example, styrene oxide or organic peroxides, pigments, extenders or fillers. As extenders and fillers there may be mentioned, for example, asphalt, bitumen, glass fibers, mica, quartz meal, kaolin or finely divided silicic acid (Aerosil). Thus, it may be of advantage to work up a solution in the cyclic ether or thioether of the complex of boron trifluoride and water or a nitrogenous base in tetrahydrofurane with the inorganic filler to form a hardener paste, and to mix the latter shortly before use with the epoxide resin or a mixture of the epoxide resin with the cyclic ether or thioether.

The compositions of this invention can be used for making rapidly hardening adhesives, laminating resins, lacquer coatings, cast resins and moulding compositions.

Compositions of the invention which contain in addition to pigments or fillers of all kinds, such as finely divided silic acid, and also plasticisers, are excellently suitable for use as filling compositions or putty-like masses.

The following examples illustrate the invention:

*Example 1*

100 grams of a liquid epoxy resin prepared in known manner by alkaline condensation of 4:4'-dihydroxydiphenyl-dimethyl methane and epichlorohydrin, containing about 5.2 epoxide equivalents per kg. of resin, are mixed with a solution of 1 part of boron trifluoride dihydrate in 26 grams of tetrahydrofurfuryl alcohol. The mixture hardens within about 2 minutes at room temperature with evolution of heat. The resulting, dark-colored casting possesses the following properties:

Impact bending strength _____ cm. kg./sq. cm__ 10.1
Bending strength _____ kg./sq. mm__ 8.8
Absorption of cold water (4 days at 20° C.) _____ percent__ 0.6
Martens value _____° C__ 38

A casting of 3 mm. thickness, heated for 48 hours at 135° C. under a pressure of 2 mm. Hg., loses 2.5% of its initial weight.

*Example 2*

100 grams of the epoxy resin used in Example 1 are mixed with 15 grams of 2-methyl-tetrahydrofuran. The resin solution which has a viscosity of 650 centiposes at 20° C., is mixed with a hardener solution of 1 gram of boron trifluoride dihydrate in 5 grams of tetrahydrofuran. The mixture hardens at room temperature with evolution of heat. A test specimen (60 x 10 x 3 mm.), heated for 48 hours at 135° C. under a pressure of 2 mm. Hg, loses 0.67% of its initial weight. This proves that the major part of 2-methyl-tetrahydrofuran (boiling at 80° C.) has undergone copolymerization with the epoxy resin.

*Example 3*

100 grams of the epoxy resin used in Example 1 are mixed with 15 grams of 2:5-dimethyl-tetrahydrofuran (boiling at 88° C.). The resulting resin solution is mixed with a hardener solution of 2.14 grams of a boron trifluoride-aniline complex (corresponding to a content of 0.625 gram of boron trifluoride) in 5 grams of tetrahydrofurfuryl alcohol. The mixture is heated in a closed vessel at 50° C. After about 2½ hours, the liquid has turned gelatinous and after 5 hours it is hard. To ascertain the proportion of tetrahydrofurfuryl alcohol which has undergone copolymerization with the epoxy resin, a casting is heated for 80 hours at 100° C. The loss in weight amounts to 0.25%.

*Example 4*

15 grams of tetrahydrofurfuryl chloride are mixed with 100 grams of the liquid epoxy resin used in Example 1. This resin solution is mixed with a hardener solution containing in 5 grams of tetrahydrofurfuryl alcohol 1 gram of boron trifluoride dihydrate. The resin hardens at room temperature with evolution of heat, no volatile constituents being split off. A hardened test specimen, kept for 48 hours at 100° C. under a vacuum of 40 mm. Hg, loses 0.15% of its initial weight.

*Example 5*

100 grams of the liquid epoxy resin used in Example 1, containing 5.2 epoxide equivalents per kg., are mixed with 7.0 grams of a boron trifluoride hardener solution of 7.2% strength, prepared as described below, and the whole is thoroughly stirred. The mixture turns gelatinous within 16½ hours without evolution of heat. It is then heated for 15 minutes at 120° C., that is to say hardened, and then cooled.

The solid casting obtained in this manner possesses the following properties:

Impact bending strength _____ cm. kg./sq. cm__ 2.4
Bending strength _____ kg./sq. mm__ 6.6
Absorption of cold water (4 days at 20° C.) _____ percent__ 0.30

The boron trifluoride hardener solution is prepared as follows:

10 grams of benzalaniline are dissolved in 36.0 cc. (40 grams) of a solution of boron trifluoride of 10% strength in tetrahydrofurfuryl alcohol.

*Example 6*

When the procedure described in Example 5 is used, except that also 20 grams of cresyl glycide and 1.4 grams of boron trifluoride hardener solution are added, a solid casting is obtained which has the following properties:

Impact bending strength _____ cm. kg./sq. cm__ 8.7
Bending strength _____ kg./sq. mm__ 12.5
Absorption of cold water (4 days at 20° C.)
  percent__ 0.21
Martens value _____ ° C __ 63

*Example 7*

100 grams of the epoxy resin used in Example 1 are mixed with 20 grams of polypropylene glycol P 425 (makers: Messrs. Union Carbide) and 8.4 grams of the boron trifluoride hardener solution of 7.2% strength described in Example 5. An elastic, soft casting is obtained which has the following properties:

Impact bending strength___ Over 25 cm. kg./sq. cm.
Bending strength_____ 10 kg./sq. mm.
Absorption of cold water (4
 days at 20° C _____ 0.33%.
Martens value_____ 42° C.

*Example 8*

100 grams of the epoxy resin used in Example 1 are mixed with 25 grams of furfuryl alcohol and with 10 grams of a boron trifluoride hardener solution of 0.1% strength prepared as described below. The whole is kept for 64½ hours at room temperature (20° C.). The mass is at this stage gelatinous but has yet no mechanical strength. It is then hardened for 2 hours at 60° C. and then for 2 hours at 100° C., to yield a casting having the following properties:

Impact bending strength _____ cm. kg./sq. cm__ 14.8
Bending strength _____ kg./sq. mm__ 13.3
Absorption of cold water (4 days at 20° C.)
  percent__ 0.38
Martens value _____ ° C __ 47

A casting of 12 mm. diameter and 93 mm. length, heated for 72 hours at 100° C. under 20 mm. Hg pressure, loses 0.4% of its initial weight.

To prepare the boron trifluoride hardener solution 55 grams of gaseous boron trifluoride are gradually introduced into a mixture of 93 grams of aniline and 93 grams of toluene, while cooling, and the reaction mixture is dried in a vacuum drying cabinet (20 mm. Hg) at 75° C. for 24 hours until the weight of the mixture remains constant. Yield: 148 grams of a dry product containing 37.1% of BF$_3$. 24.6 grams of this dry product are dissolved in 75.4 grams of tetrahydrofurfuryl alcohol so that the resulting boron trifluoride+aniline hardener solution contains 9.1% of boron trifluoride.

*Example 9*

When the procedure described in Example 8 is used, except that furfurol is used instead of furfuryl alcohol, a casting is obtained which has the following properties:

Impact bending strength___ 25.7 cm./kg./sq. cm.
Bending strength_____ 7.4 kg./sq. mm. (no fracture at maximum deflection).
Absorption of cold water (4
 days at 20° C.)_____ 1.0%.
Martens value_____ 29° C.

A casting of 12 mm. diameter and 93 mm. length, heated for 72 hours at 100° C. under 20 mm. Hg pressure, loses 1.13% of its initial weight.

*Example 10*

When the procedure described in Example 8 is used, except that 2-methylfuran (silvan) is used instead of furfuryl alcohol, a casting is obtained which has the following properties:

Impact bending strength _____ cm. kg./sq. cm__ 22
Bending strength _____ kg./sq. mm__ 4.2
Absorption of cold water (4 days at 20° C.)
  percent__ 0.51
Martens value _____ ° C __ 31

A casting of 12 mm. diameter and 96 mm. length, heated for 72 hours at 100° C. under 20 mm. Hg pressure, loses 1.63% of its initial weight.

*Example 11*

When the procedure described in Example 8 is used, except that 3-methylthiophene is used instead of furfuryl alcohol, a casting is obtained having the following properties:

Impact bending strength _____ cm. kg./sq. cm__ 18.5
Bending strength _____ kg./sq. mm__ 4.4
Absorption of cold water (4 days at 20° C.)
  percent__ 0.36
Martens value _____ ° C __ 33

A casting of 12 mm. diameter and 58 mm. length, heated for 72 hours at 100° C. under 20 mm. Hg pressure, loses 0.18% of its initial weight.

*Example 12*

When the procedure described in Example 8 is used, except that 2-acetylthiophene is used instead of furfuryl alcohol, a casting is obtained having the following properties:

Impact bending strength _____ cm. kg./sq. cm__ 20.1
Bending strength _____ kg./sq. mm__ 8.0
Absorption of cold water (4 days at 20° C.)
  percent__ 0.42
Martens value _____ ° C __ 39

A casting of 12 mm. diameter and 90 mm. length, heated for 72 hours at 100° C. under 20 mm. Hg pressure, loses 0.6% of its initial weight.

When the boron trifluoride-amine complex is replaced by 6.25 cc. of a boron trifluoride hardener solution of 10% strength prepared as described below, the resulting product gelatinizes and hardens within 30 seconds accompanied by strong evolution of heat. The resulting casting possesses the following properties:

Impact bending strength _____ cm. kg./sq. cm__ 24.9
Bending strength _____ kg./sq. mm__ 6.3
Absorption of cold water (4 days at 20° C.)
  percent__ 0.35
Martens value _____ ° C __ 30

The boron trifluoride hardener solution is obtained by diluting 15.4 grams of boron trifluoride dihydrate (containing 65% of BF$_3$) with tetrahydrofuran to 100 cc.

*Example 13*

When the procedure described in Example 8 is used, except that α-thiophene aldehyde is used instead of furfuryl alcohol, a casting is obtained which has the following properties:

Impact bending strength _____ cm. kg./sq. cm__ 5.6
Bending strength _____ kg./sq. mm__ 9.8
Absorption of cold water (4 days at 20° C.)
  percent__ 0.63
Martens value _____ ° C 39

A casting of 12 mm. diameter and 92 mm. length, heated for 72 hours at 100° C. under 20 mm. Hg pressure, losses 0.64% of its initial weight.

When the boron trifluoride-amine complex is replaced by 6.25 cc. of the boron trifluoride hardener solution described in the last paragraph of Example 12, the mass hardens within 30 seconds with strong evolution of heat. The resulting casting has the following properties:

Impact bending strength _____cm. kg./sq. cm__ 2.2
Bending strength _____kg./sq. mm__ 11.1
Absorption of cold water (4 days at 20° C.)
    percent__ 0.35

Example 14

When the procedure described in Example 8 is used, except that 2:3-benzothiophene (thionaphthene) is used instead of furfuryl alcohol, and 10 grams styrene oxide are further added, the resulting mass hardens within 1½ minutes with strong evolution of heat. The casting obtained in this manner has the following properties:

Impact bending strength _____cm. kg./sq. cm__ 11.6
Bending strength _____kg./sq. mm__ 6.2
Absorption of cold water (4 days at 20° C.)
    percent__ 0.29
Martens value _____° C__ 32

Example 15

When the procedure described in Example 8 is used, except that 2-benzoylthiophene is used instead of furfuryl alcohol and 10 grams of butyl glycide are further added, the resulting casting has the following properties:

Impact bending strength _____cm. kg./sq. cm__ 6.9
Bending strength _____kg./sq. mm__ 8.0
Absorption of cold water (4 days at 20° C.)
    percent__ 0.28
Martens value _____° C__ 37

A casting of 12 mm. diameter and 84 mm. length, heated for 72 hours at 100° C. under 12 mm. Hg pressure, loses 0.58% of its initial weight.

When the boron trifluoride-amine complex is replaced by 6.25 cc. of the boron trifluoride hardener solution described in the last paragraph of Example 12, the mass hardens within 30 seconds, and the casting thus obtained has the following properties:

Impact bending strength _____ 10.8 cm. kg./sq. cm.
Bending strength _____ 2.9 kg./sq. mm. (no fracture at maximum deflection).
Absorption of cold water (4 days at 20° C.) _____ 0.26%.
Martens value _____ 25° C.

A casting of 12 mm. diameter and 80 mm. length, heated for 72 hours at 100° C. under 12 mm. Hg pressure, loses 1.2% of its initial weight.

Example 16

100 grams of the epoxy resin used in Example 1 are mixed with 25 grams of furan and with 10 grams of the boron trifluoride hardener solution of 9.1% strength described in Example 8.

The whole is kept for 64 hours at room temperature (20° C.), by which time the mass has gelatinized but has not yet any mechanical strength. It is then hardened for 2 hours at 60° C. and for another 2 hours at 100° C., to yield a casting having the following properties:

Impact bending strength _____cm. kg./sq. cm__ 13.4
Bending strength _____kg./sq. mm__ 4.5
Absorption of cold water (4 days at 20° C.)
    percent__ 0.16
Martens value _____° C__ 31

Example 17

When the procedure described in Example 16 is used, except that thiophene is used instead of furan, a casting is obtained which has the following properties:

Impact bending strength _____cm. kg./sq. cm__ 16.6
Bending strength _____kg./sq. mm__ 5.6
Absorption of cold water (4 days at 20° C.)
    percent__ 0.29
Martens value _____° C__ 35

Example 18

100 grams of the epoxy resin used in Example 1 are thoroughly mixed with 20 cc. of tetrahydrofurfuryl alcohol and a solution of 0.7 gram of 1-hydroxy-cyclohexane hydroperoxide in 20 cc. of monomeric styrene, and 5.6 cc. of a solution of boron trifluoride of 5% by volume strength in tetrahydrofuran. After 2½ minutes hardening sets in with strong evolution of heat, and a casting is obtained which has the following properties:

Impact bending strength _____cm. kg./sq. cm__ 23.9
Bending strength _____kg./sq. mm__ 5.6
Absorption of cold water (4 days at 20° C.) _____percent__ 0.45
Martens value _____° C__ 28

Example 19

30 grams of the epoxy resin described in Example 1 are mixed with 8 cc. of a solution of antimony pentachloride of 10% by volume strength in tetrahydrofurfuryl alcohol, and a sufficiency of tetrahydrofurfuryl alcohol is then added to achieve a total weight of 40 grams.

A dark-colored resin+hardener mixture is obtained which remains fit for use for 3 minutes. When poured over panes of glass and hardened for 4 hours at 120° C., this mixture leaves a film having a pendulum hardness according to Persoz of 355 for a film 80 microns thick. The Erichson value of a film produced on aluminum sheet in analogous manner is 10 mm.

Example 20

When the procedure described in Example 19 is used, except that tin tetrachloride is used instead of antimony pentachloride, a resin+hardener mixture is obtained which remains fit for use for 1 minute at room temperature. In a casting mould the mixture hardens with strong evolution of heat to form a brownish casting which is hard and shock-resistant at room temperature. A film produced on glass as described in Example 19 has for a thickness of 70 microns a Persoz hardness of 342.

Example 21

50 grams of a pasty phenol novolak polyglycidyl ether from 1 mol of phenol, 0.5 mol of formaldehyde and 3 mols of epichlorohydrin are diluted with 50 grams of hexanetriol triglycidyl ether and mixed with a solution of 5 grams of a boron trifluoride-aniline complex in 15 grams of tetrahydrofurfuryl alcohol. In a casting mould this mixture hardens at 50° C. within 10 minutes to yield a casting having a Shore hardness of 97. A test specimen of 3 mm. thickness, cut therefrom, loses 3.4% of its weight on being heated for 72 hours at 150° C.

Example 22

A monoester obtained by reacting 19.6 grams of maleic anhydride with 20.4 grams of tetrahydrofurfuryl alcohol, admixed with 5 grams of boron trifluoride-monoethylamine complex, is added to 100 grams of 3:4-epoxy-6-methyl-cyclohexylmethyl-3:4-epoxy - 6 - methyl-cyclohexane carboxylate (EP 201; product of Messrs. Union Carbide) and 5 grams of methacrylic acid glycide. The mixture hardens within 5 hours in a casting mould at room temperature to yield a casting having a Shore hardness of 98.

Example 23

By aliphatic treatment of a condensation product from 1 mol of aniline and at least 2 mols of epichlorohydrin a liquid epoxy resin is prepared which contains 6.7 gram equivalents of epoxide group per kg.

100 grams of this epoxy resin are mixed with 20 grams of tetrahydrofurfuryl alcohol, 5 grams of a boron trifluoride-monoethylamine complex and 45 grams of asbestos powder, and the resulting mass is heated in a casting mould for 24 hours at 135° C. A solid casting is obtained which has a Shore hardness of 97.

*Example 24*

30 grams of the epoxy resin described in Example 1 are thoroughly mixed with a solution of 0.4 gram of zinc fluoborate in 10 grams of tetrahydrofurfuryl alcohol. A resin+hardener mixture is obtained which can be stored for over 3 weeks at room temperature. In a casting mould this mixture hardens within 33 minutes at 120° C. to yield a hard, transparent, shock-resistant casting.

When this mixture is poured over a pane of glass and hardened for 4 hours at 120° C., a clear, colorless, elastic coating is obtained which has a pendulum hardness according to Persoz of 360 for a film thickness of 72 microns.

*Example 25*

When 1:4-butanediol diglycidyl ether is used instead of the epoxy resin described in Example 1, proceeding otherwise as described in Example 24, a resin+hardener mixture is obtained which can be kept for over 3 weeks at room temperature. In a casting mould this mixture hardens within 13 minutes at 120° C. to yield a hard, transparent, shock-resistant casting.

When the above mixture is poured over a pane of glass and hardened for 4 hours at 120° C., a clear, colorless, elastic coating is obtained which has a pendulum hardness according to Persoz of 307 for a film thickness of 213 microns.

*Example 26*

When vinyl cyclohexene dioxide is used instead of the epoxy resin described in Example 1, proceeding otherwise as described in that example, a resin+hardener mixture is obtained which can be stored for 2 days at room temperature. In a casting mould this mixture hardens within 4 hours at 120° C. to form a hard, transparent casting.

When this mixture is poured over a pane of glass and hardened for 4 hours at 120° C., a clear, colorless, brittle coating is obtained which for a thickness of 100 microns has a pendulum hardness according to Persoz of 366.

*Example 27*

When the procedure described in Example 24 is employed, except that tin fluoborate is used instead of zinc fluoborate, a resin+hardener mixture is obtained which remains fit for use for 16 minutes; with lead fluoborate for over 9 days; with iron fluoborate for 8 days; and with nickel fluoborate for over 8 days.

When these mixtures are poured over panes of glass or aluminum sheet and heated for 4 hours at 120° C., the resulting coatings possess the following properties.

With tin fluoborate: pendulum hardness according to Persoz: 400 for a coating 80μ thick (glass pane); Erichson value: 10 mm. (aluminum sheet).
With lead fluoborate: pendulum hardness according to Persoz: 288 for a coating 45μ thick (glass pane); Erichson value: 10.0 mm. (aluminum sheet).
With iron fluoborate: pendulum hardness according to Persoz: 375 for a coating 60μ thick (glass pane); Erichson value: 6.5 mm. (aluminum sheet).
With nickel fluoborate: pendulum hardness according to Persoz: 410 for a coating 60μ thick (glass pane); Erichson value: 3.9 mm. (aluminum sheet).

When these mixtures are hardened with the aforementioned metal fluoborates in a casting mould, castings of great hardness and shock-resistance are obtained.

*Example 28*

A solution of 3 grams of iron fluoborate in 4.8 grams of tetrahydrofurfuryl alcohol is thoroughly mixed with 28.2 grams of the epoxy resin described in Example 1. 1 gram of glycerol monostearate, 38 grams of calcined caolin ("Molochit") and 23 grams of glass fibers of 3 cm. length are then added to the above mixture and the whole is thoroughly mixed in a mixing kneader, to yield a pasty, still slightly tacky mass. By compressing this mass for 2 minutes at 145° C. under a pressure of about 40 kg. per square centimeter, a casting is obtained which has good impact and bending strength properties.

When the procedure described is employed, except that the diepoxide ("EP 201") described in Example 22 is used instead of the epoxy resin described in Example 1, the resulting moulding mass likewise hardens rapidly. It can be used for making castings having good impact and bending strength properties.

What is claimed is:
1. The process for making a hardenable composition, comprising the steps of intimately mixing (1) a 1:2-epoxide compound having a 1:2-epoxide equivalency greater than 1 with (2) a tetrahydofurane substituted by a radical selected from the group consisting of alkyl, hydroxyalkyl, chloroalkyl, acetyl and benzoyl in the presence of (3) a catalytic amount of a member selected from the group consisting of boron trifluoride, the fluoborates of zinc, tin, lead, iron, nickel, copper, cobalt, magnesium, cadmium, mercury, calcium, strontium, barium and aluminum, with the proviso that when boron trifluoride is employed, there is also employed (4) a complex-forming compound capable of forming a stable complex with boron trifluoride selected from the group consisting of water, ammonia, ethylamine, ethylenediamine, mono-ethanolamine, piperidine, triethanolamine, urea, hexamethylenetetramine, trimethylamine, pyridine, aniline, toluidine and Schiff's bases, about 0.2 to about 3.0 parts by weight of the complex-forming compound being employed for each part by weight of the boron trifluoride, and 5–50 parts by weight of (2) for every 100 parts by weight of (1).

2. A process according to claim 1, wherein there are employed 10–30 parts of (2) for every 100 parts by weight of (1).

3. A process according to claim 1, in which the substituted tetrahydrofurane is tetrahydrofurfuryl alcohol.

4. A process according to claim 1, in which the 1:2-epoxide compounds is a polyglycidyl ether of a polyhydric phenol.

5. A product produced by the process of claim 1.

References Cited in the file of this patent

UNITED STATES PATENTS

| | | |
|---|---|---|
| 2,717,885 | Greenlee | Sept. 13, 1955 |
| 2,886,057 | Peck | Dec. 23, 1958 |
| 2,993,915 | Luskin | July 25, 1961 |
| 3,025,307 | Garber et al. | Mar. 13, 1962 |

FOREIGN PATENTS

| | | |
|---|---|---|
| 162,773 | Australia | May 10, 1955 |
| 200,876 | Australia | Feb. 15, 1956 |
| 898,269 | France | July 3, 1944 |